(12) United States Patent
Masuda

(10) Patent No.: US 10,479,341 B2
(45) Date of Patent: Nov. 19, 2019

(54) ELECTRICALLY POWERED BRAKE DEVICE

(71) Applicant: NTN CORPORATION, Osaka (JP)

(72) Inventor: Yui Masuda, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/817,595

(22) Filed: Nov. 20, 2017

(65) Prior Publication Data

US 2018/0072295 A1 Mar. 15, 2018

Related U.S. Application Data

(63) Continuation of application No. PCT/JP2016/064872, filed on May 19, 2016.

(30) Foreign Application Priority Data

May 22, 2015 (JP) ................. 2015-104293

(51) Int. Cl.
*B60T 17/22* (2006.01)
*B60T 8/17* (2006.01)
(Continued)

(52) U.S. Cl.
CPC .............. *B60T 17/221* (2013.01); *B60T 8/17* (2013.01); *B60T 13/74* (2013.01); *B60T 13/741* (2013.01);
(Continued)

(58) Field of Classification Search
CPC ........ B60T 17/221; B60T 8/17; B60T 13/741; B60T 13/74; B60T 2250/04; F16D 65/18;
(Continued)

(56) References Cited

U.S. PATENT DOCUMENTS 7,161,323 B2 * 1/2007 Ajima .................... B62D 5/046
318/560
7,422,294 B2 9/2008 Yamamoto
(Continued)

FOREIGN PATENT DOCUMENTS

CN 1978260 A 6/2007
JP 6-327190 11/1994
(Continued)

OTHER PUBLICATIONS

Translation of Japanese Patent No. 2003322182 obtained from https://worldwide.espacenet.com on Nov. 28, 2018.*
(Continued)

*Primary Examiner* — Pamela Rodriguez

(57) ABSTRACT

This electric brake device includes: a brake rotor; a friction member; friction member operator configured to bring the friction member into contact with the brake rotor; an electric motor configured to drive the friction member operator; and a controller configured to control a braking force by means of the electric motor. The controller includes: heat balance degree estimator configured to estimate a balance degree among heat generation amounts of a plurality of exciting coils in the electric motor; and heat load balancing section configured to decrease a heat generation amount of a specific exciting coil when the heat balance degree estimator has estimated that the heat generation amount of the specific exciting coil among the plurality of exciting coils is larger than heat generation amounts of the other exciting coils.

6 Claims, 6 Drawing Sheets

(51) Int. Cl.
| | |
|---|---|
| *B60T 13/74* | (2006.01) |
| *F16D 65/18* | (2006.01) |
| *H02P 7/06* | (2006.01) |
| *H02K 7/102* | (2006.01) |
| *H02P 29/64* | (2016.01) |
| *F16D 66/00* | (2006.01) |
| *H02K 7/14* | (2006.01) |
| *H02P 6/08* | (2016.01) |
| *F16D 121/24* | (2012.01) |

(52) U.S. Cl.
CPC ............ *F16D 65/18* (2013.01); *F16D 66/00* (2013.01); *H02K 7/102* (2013.01); *H02K 7/14* (2013.01); *H02P 6/08* (2013.01); *H02P 7/06* (2013.01); *H02P 29/64* (2016.02); *B60T 2250/04* (2013.01); *F16D 2066/001* (2013.01); *F16D 2066/005* (2013.01); *F16D 2066/006* (2013.01); *F16D 2121/24* (2013.01)

(58) Field of Classification Search
CPC ................. F16D 66/00; F16D 2121/24; F16D 2066/001; F16D 2066/005; F16D 2066/006; H02P 6/08; H02P 29/64; H02P 7/06; H02K 7/14; H02K 7/102
USPC ...... 303/191, 121, 124, 142, 162, 115.2, 20; 188/158, 160, 162; 318/432, 433, 434
See application file for complete search history.

(56) References Cited

U.S. PATENT DOCUMENTS

| | | | |
|---|---|---|---|
| 7,810,616 B2 | 10/2010 | Nakazeki | |
| 8,994,307 B2* | 3/2015 | Bates | ...................... H02P 25/18 |
| | | | 310/179 |
| 9,590,551 B2* | 3/2017 | Omata | ................... H02P 21/26 |
| 2007/0132310 A1 | 6/2007 | Yamamoto | |
| 2008/0110704 A1 | 5/2008 | Nakazeki | |

FOREIGN PATENT DOCUMENTS

| | | | | |
|---|---|---|---|---|
| JP | 11-234964 | | 8/1999 | |
| JP | 2003-322182 | | 11/2003 | |
| JP | 2003322182 | A * | 11/2003 | |
| JP | 2004-208453 | | 7/2004 | |
| JP | 2006-194356 | | 7/2006 | |
| JP | 2008-14323 | | 1/2008 | |
| JP | 2010-119255 | | 5/2010 | |
| JP | 2010119255 | A * | 5/2010 | |
| WO | WO 2009/104791 A1 | | 8/2009 | |

OTHER PUBLICATIONS

Translation of Japanese Patent No. 2010119255 obtained from https://worldwide.espacenet.com on Nov. 28, 2018.*
English Language Translation of the International Preliminary Report on Patentability dated Dec. 7, 2017 in corresponding International Patent Application No. PCT/JP2016/064872.
Notification of Reasons for Refusal dated Dec. 11, 2018 in corresponding Japanese Patent Application No. 2015-104293, with machine English translation (6 pages).
Extended and Supplementary Search Report dated Dec. 7, 2018 in related European Patent Application No. 16799918.4 (7 pages).
International Search Report dated Jul. 19, 2016 in corresponding International Patent Application No. PCT/JP2016/064872.
Office Action dated Jul. 31, 2019 in related Chinese patent application No. 201680029166.3.

* cited by examiner

Related Art

ELECTRICALLY POWERED BRAKE DEVICE

CROSS REFERENCE TO THE RELATED APPLICATION

This application is a continuation application, under 35 U.S.C. § 111(a), of international application No. PCT/JP2016/064872, filed May 19, 2016, which is based on and claims Convention priority to Japanese patent application No. 2015-104293, filed May 22, 2015, the entire disclosure of which is herein incorporated by reference as a part of this application.

BACKGROUND OF THE INVENTION

Field of the Invention

The present invention relates to an electrically powered brake device or electric brake device, and to a technology for improving durability of this electric brake device.

Description of Related Art

As an electric brake device using an electric motor, the following technologies have been proposed.
1. An electric brake device that converts rotary motion of an electric motor to linear motion through a linear motion mechanism by pushing a brake pedal to press a brake pad against a brake disc and bring the brake pad into contact with the brake disc, thereby applying a braking force (Patent Document 1).
2. An electric brake device using a planetary roller screw mechanism (Patent Document 2).
3. A technology in which a thermistor is provided at a neutral point terminal of coils of respective phases in an electric motor, and the mean temperature of the respective phase coils is measured by the thermistor (Patent Document 3).
4. A technology of estimating a coil temperature on the basis of a temperature characteristic of voltage, current, and copper resistance when an electric motor is in a stopped state or stoppage state (Patent Document 4).

RELATED DOCUMENT

Patent Document

[Patent Document 1] JP Laid-open Patent Publication No. H6-327190
[Patent Document 2] JP Laid-open Patent Publication No. 2006-194356
[Patent Document 3] JP Laid-open Patent Publication No. H11-234964
[Patent Document 4] JP Laid-open Patent Publication No. 2004-208453

In such an electric brake device as in Patent Document 1 or 2, there is a risk, for example, that the braking functionality is reduced when an abnormality occurs in a coil of the electric motor. For this electric motor, the mounting space in the vehicle is very limited, and there is a problem that increase in the unsprung weight of the vehicle due to increase in the size of the electric motor impairs the riding comfort of occupants. Thus, a design is sometimes difficult to be made in which copper loss is reduced by making the motor coil thick, etc., thereby to reduce the heat generation amount.

In order to avoid the above-described situation, temperature management of the motor coil is required. A technique of estimating the motor coil temperature by use of a temperature-dependent characteristic of the resistance value of copper, as shown in Patent Document 4, for example, and a technique in which a thermo-sensitive device such as a thermistor is disposed at a motor coil, as shown in Patent Document 3, for example, are used in general.

However, for example, in a servomotor of a system such as an electric actuator used in an electric brake, current is concentrated on a specific coil among a plurality of coils, thus causing uneven heat generation, and therefore, accurate coil temperature cannot be obtained in some cases. Even if the accurate coil temperature is obtained, the above-described current concentration causes the heat load to be concentrated on only the specific coil, which could cause reduced durability against heat.

SUMMARY OF THE INVENTION

An object of the present invention is to provide an electric brake device that can improve durability against heat of an electric motor of the electric brake device.

Hereinafter, for convenience of easy understanding, description of the present invention will be given with reference to the reference characters used in embodiments.

An electric brake device of the present invention includes:
a brake rotor 8;
a friction member 9 configured to be brought into contact with the brake rotor 8;
a friction member operator 6 configured to bring the friction member 9 into contact with the brake rotor 8;
an electric motor 4 configured to drive the friction member operator 6; and
a controller 2 configured to control a braking force by means of the electric motor 4, wherein
the controller 2 includes:
a heat balance degree estimator 19 configured to estimate a balance degree among heat generation amounts of a plurality of exciting coils 4c in the electric motor 4; and
a heat load balancing section 23 configured to decrease a heat generation amount of a specific exciting coil 4c, when the heat balance degree estimator 19 has estimated that the heat generation amount of the specific exciting coil 4c among the plurality of exciting coils 4c is larger than heat generation amounts of the other exciting coils 4c.

The exciting coils 4c are, for example, three-phase coils forming magnetic poles for causing rotation in the electric motor 4. The balance degree among the heat generation amounts is the relative difference, caused by variation in losses of the exciting coils 4c, among the heat generation amounts that occur in the respective exciting coils 4c.

According to this configuration, in a case where the braking force is maintained to be constant, the motor phase currents are continuously applied always at constant levels. Thus, the losses of the respective exciting coils 4c vary, which results in a difference in the heat generation amounts of the respective exciting coils 4c. Thus, the heat balance degree estimator 19 estimates the balance degree of the heat generation amounts of the plurality of exciting coils 4c. When the heat balance degree estimator 19 has estimated that the heat generation amount of the specific exciting coil 4c is larger than the heat generation amounts of the other exciting coils 4c, the heat load balancing section 23 decreases the heat generation amount of the specific exciting coil 4c. Accordingly, durability against heat of the electric motor 4 can be improved. Thus, with respect to the electric motor 4, the rated torque can be improved or the output limit time of the maximum torque can be extended. In addition, the design requirement for copper loss relative to torque can be reduced, and the size and weight of the electric motor 4 can be reduced.

A configuration may be employed in which the electric brake device includes a braking force estimator Sa configured to determine an estimated value of a braking force that occurs by the friction member 9 being pressed against the brake rotor 8, wherein the controller 2 includes an allowable error setting section 24 configured to set an allowable error that is to be used in follow-up control performed on the braking force with respect to a target braking force, and the heat load balancing section 23 causes the braking force to be varied such that an energization phase is realized in which an absolute value of a current of the specific exciting coil 4c becomes smaller than an original value thereof within a range of the allowable error set by the allowable error setting section 24.

In this case, the allowable error setting section 24 sets a range (the range of the allowable error) which allows the electric motor 4 to be operated irrespective of the target braking force. The heat load balancing section 23 decreases the heat generation amount of the specific exciting coil 4c by causing the braking force to be slightly varied so as to realize an energization phase in which the absolute value of the current of the specific exciting coil 4c becomes smaller than the original value thereof within the range of the allowable error. In this manner, by causing the braking force to be slightly varied relative to the target braking force within the allowable error range, it is possible to equalize the heat generation amounts (heat loads) of the respective exciting coils 4c.

The allowable error setting section 24 may cause the allowable error to be varied such that the larger the target braking force or the braking force is, the larger the allowable error becomes. In this case, fine or detailed control can be realized such that: when the braking force is large and thus the electric motor 4 readily generates heat, the heat load balancing section 23 readily performs control of varying the braking force; and when the braking force is small and thus the electric motor 4 does not readily generate heat, the heat load balancing section 23 does not readily perform the control. This is preferable because unexpected braking force variation is less likely to occur.

A configuration may be employed in which the controller 2 includes a vehicle speed information obtaining section 26 configured to obtain information of vehicle speed of a vehicle to which the electric brake device DB is mounted, and the allowable error setting section 24 causes the allowable error to be varied such that the lower the vehicle speed obtained by the vehicle speed information obtaining section 26 is, the larger the allowable error becomes. In this case, fine or detailed control can be realized such that: for example, when the vehicle is traveling at a middle-to-low speed, the allowable error is made larger such that the heat load balancing section 23 readily performs control of varying the braking force; and when the vehicle is traveling at a high speed where highly accurate braking force control is required, the allowable error is made smaller such that the heat load balancing section 23 does not readily perform the control.

The heat balance degree estimator 19 may estimate the balance degree among the heat generation amounts of the respective exciting coils 4c on the basis of an integrated value of a value proportional to a square of an estimated value of a current in each exciting coil 4c. In a case where a predetermined braking force is maintained, since copper loss of an exciting coil 4c is proportional to the square of the current, the heat balance degree estimator 19 estimates the balance degree among the heat generation amounts of the respective exciting coils 4c on the basis of an integrated value of a value proportional to the square of an estimated value of a current in each exciting coil 4c.

A configuration may be employed in which when the heat balance degree estimator 19 has determined that a value of either one of or both of: a difference between the integrated value in a determined exciting coil 4c and the integrated values of the other exciting coils 4c; and a ratio of the differences has exceeded a threshold, the heat load balancing section 23 decreases the heat generation amount of the specific exciting coil 4c. The threshold is determined on the basis of a result of a test or a simulation, for example.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
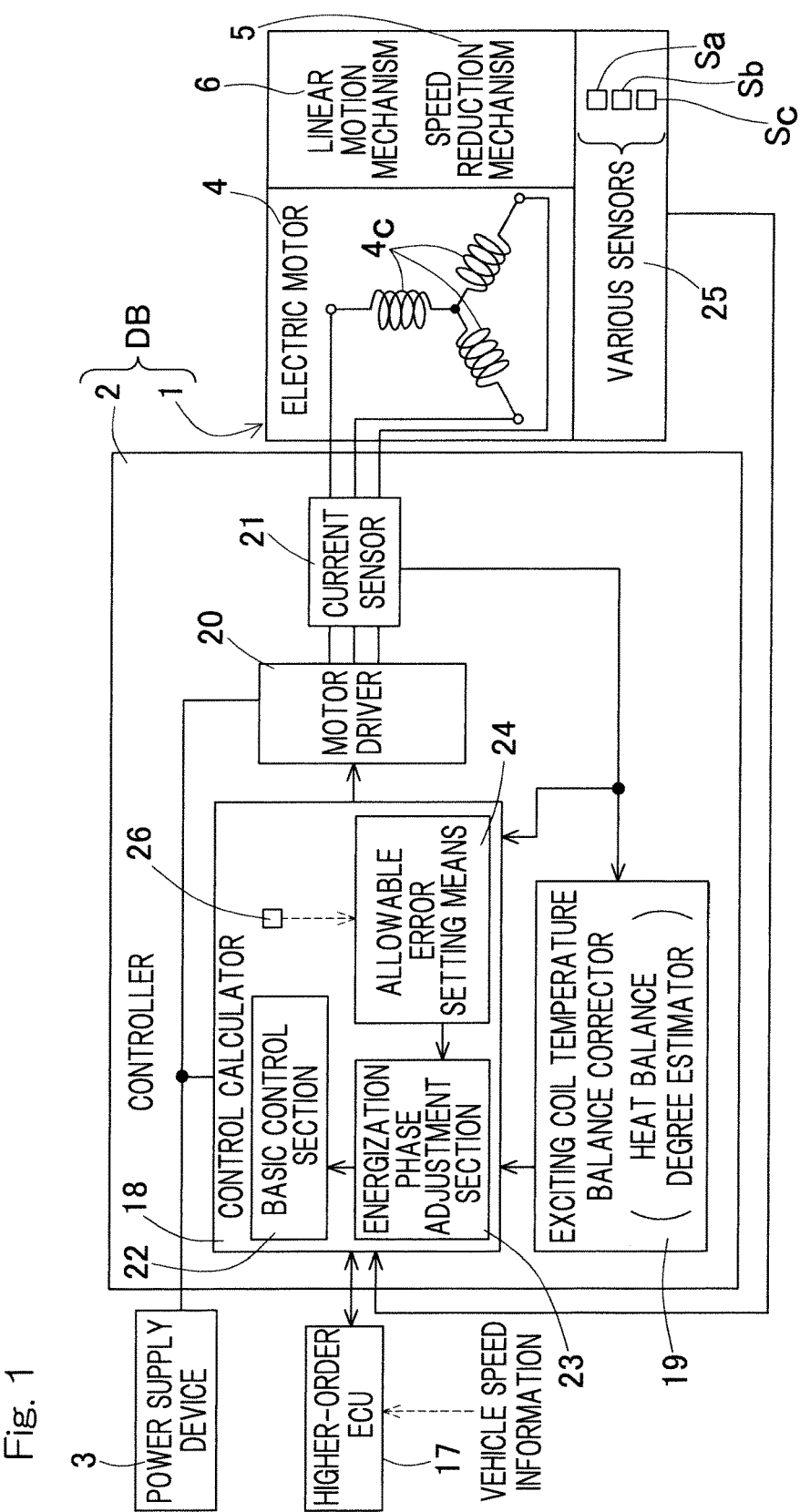
FIG. 1 is a block diagram of a control system of an electric brake device according to an embodiment of the present invention.

An electric brake device according to an embodiment of the present invention is described with reference to FIG. 1 to FIG. 6. As shown in FIG. 1, an electric brake device DB includes an electric brake actuator 1 and a controller 2. The electric brake device DB is mounted on a vehicle. In this case, although not shown, the electric brake device DB is provided for each wheel, for example. A power supply device 3 and a higher-order ECU 17 which is higher-order control unit for the controller 2 are connected to the controller 2. First, the electric brake actuator 1 is described.

Figure 2:
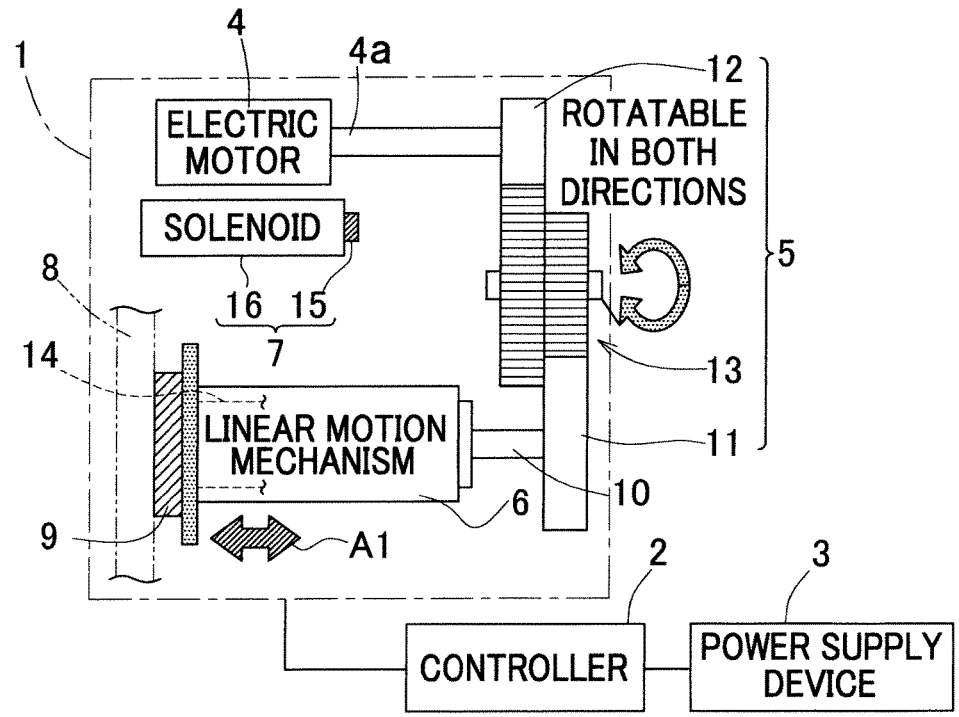
FIG. 2 is a schematic diagram showing an electric brake actuator of the electric brake device.

As shown in FIG. 2, the electric brake actuator 1 includes: an electric motor 4; a speed reduction mechanism 5 which reduces a speed of rotation or number of rotation per unit time of the electric motor 4; a linear motion mechanism 6 which is friction member operator; a parking brake mechanism 7 which is a parking brake; a brake rotor 8; and a friction member 9. The electric motor 4, the speed reduction mechanism 5, and the linear motion mechanism 6 are incorporated in, for example, a housing, which is not shown, or the like. The electric motor 4 is composed of a three-phase synchronous motor or the like.

The speed reduction mechanism 5 reduces the speed of rotation of the electric motor 4 and transmits the reduced rotation to a rotation shaft 10 of the linear motion mechanism 6. The speed reduction mechanism 5 includes a primary gear 12, an intermediate (secondary) gear 13, and a tertiary gear 11. In this example, the speed reduction mechanism 5 is able to reduce, by the intermediate gear 13, the speed of rotation of the primary gear 12 mounted to a rotor shaft 4a of the electric motor 4 and transmit the reduced rotation to the tertiary gear 11 fixed to an end portion of the rotation shaft 10.

The linear motion mechanism 6 which is the friction member operator converts rotary motion outputted from the speed reduction mechanism 5 to linear motion of a linear motion portion 14 by a feed screw mechanism, and bring the friction member 9 into contact with the brake rotor 8 or separate the friction member 9 from the brake rotor 8. The linear motion portion 14 is supported in such a manner as to be prevented from rotating and as to be movable in an axial direction shown by an arrow A1 in FIG. 2. The friction member 9 is provided at an outboard-side end of the linear motion portion 14. Rotation of the electric motor 4 is transmitted to the linear motion mechanism 6, through the speed reduction mechanism 5, thereby converting the rotary motion to the linear motion, and the linear motion is converted to a pressing force of the friction member 9, thereby generating the braking force which is an axial force of the linear motion mechanism 6. It should be noted that, in a state where a plurality of the electric brake devices DB (FIG. 1) are mounted to a vehicle, the outer side of the vehicle is referred to as outboard side, and the center side of the vehicle is referred to as inboard side.

For example, a linear solenoid is used as an actuator 16 of the parking brake mechanism 7. The actuator 16 causes a lock member (solenoid pin) 15 to be advanced, to be fitted into and engaged with a locking hole (not shown) formed in the intermediate gear 13, thereby preventing rotation of the intermediate gear 13. Accordingly, a parking lock state is realized. When the lock member 15 is disengaged from the locking hole to allow rotation of the intermediate gear 13, an unlock state is realized.

The controller and the like shown in FIG. 1 are described. As the higher-order ECU 17, an electric control unit that performs general control of the vehicle is used, for example. The higher-order ECU 17 has an integrated control function for the electric brake devices DB. From the higher-order ECU 17, for example, a target value (target braking force) of a braking force or the like is inputted to a control calculator 18 of the controller 2. It is sufficient that a target braking force is a value that corresponds to a braking force, and may be, for example, a value detected by a braking force sensor, or a motor angle that causes a desired braking force to be generated.

The power supply device 3 supplies electric power to each of the electric motor 4 and the controller 2 in each electric brake device DB. The controller 2 includes: the control calculator 18, an exciting coil temperature balance corrector (described later) 19 which is heat balance degree estimator; a motor driver 20, a current sensor 21, and the like. The control calculator 18 and the exciting coil temperature balance corrector 19 may be each implemented, for example, by a processor such as a microcomputer, or a hardware module such as ASIC, FPGA, or DSP. The exciting coil temperature balance corrector 19 can include a ROM (read only memory) having a program to be executed by the processor, and other electronic circuits such as a RAM (random access memory) and a co-processor, etc.

The control calculator 18 includes: a basic control section 22; an energization phase adjustment section 23 (described later) which is a heat load balancing section; and an allowable error setting section 24 (described later). The basic control section 22 generates, on the basis of values obtained by various sensors 25, a control signal for a motor driver 20 so as to achieve the control target obtained from the higher-order ECU 17. The motor driver 20 converts DC power from the power supply device 3 to three-phase AC power to be used in driving the electric motor 4. The motor driver 20 may form a half-bridge circuit, a full-bridge circuit, or the like that uses a switching element such as MOSFET or IGBT, for example. The motor driver 20 may include a predriver that instantaneously drives the switching element.

The current sensor 21 is current detector which determines currents that are to be caused to flow in three-phase exciting coils 4c, respectively. The current sensor 21 is one of the above-mentioned various sensors 25. For example, the current sensor 21 may be a current sensor of a type that detects magnetic field that is occurred around the power transmission route, or a current sensor of a type that detects a voltage drop amount by use of a shunt resistor and an operational amplifier, or alternatively, may perform estimation on the basis of a characteristic equation regarding current and voltage of the electric motor 4. Further, when measurement of the three-phase current is performed, currents of only two phases of the three phases are measured, and the remaining one phase may be determined by use of a characteristic that the total sum of the currents of three phases is zero, for example.

As the electric motor 4, a brushless DC motor is used, for example. The brushless DC motor is suitable for an electric servo system in which high speed, small size, and high accuracy are realized. In the case of the brushless DC motor, the exciting coil 4c of the electric motor 4 may be in the form of concentrated winding in which winding is concentrated on one tooth, or may be in the form of distributed winding in which winding is made over a plurality of teeth. When the concentrated winding and the distributed winding are compared with each other, the concentrated winding allows downsizing, and thus, is suitable for an electric brake device for which the mounting space is limited, whereas the distributed winding can realize high efficiency and low torque ripple.

As the various sensors 25, a braking force sensor Sa which is braking force estimator, a rotor angle sensor Sb, a temperature sensor Sc, or the like can be used. It is sufficient that the braking force sensor Sa can estimate an actually-occurring braking force, on the basis of the characteristic of the electric brake actuator 1 and on the basis of a detection value obtained by sensing the influence that has been caused by operation of the electric brake device DB and that is occurring in the electric brake device DB itself or the wheel. Alternatively, the braking force sensor Sa may be a load sensor which detects the load of the electric brake actuator 1, for example.

As the load sensor, a magnetic sensor is used, for example. As shown in FIG. 2, when the friction member 9 presses the brake rotor 8, a counterforce toward the inboard side acts on the linear motion portion 14. The load sensor which is a magnetic sensor magnetically detects this counterforce of the braking force, as a displacement amount in the axial direction. If the relationship between the output from the sensor and the counterforce of the braking force is set in advance through a test or the like, the braking force estimator can estimate the braking force on the basis of an output from the load sensor. As the load sensor, an optical sensor, an eddy current-type sensor, or a capacitance-type sensor can be used instead of the magnetic sensor.

As the rotor angle sensor Sb shown in FIG. 1, for example, a sensor such as a resolver or a magnetic encoder may be mounted to the electric motor 4, and the rotor angle may be obtained through so-called sensor-less estimation by use of coil voltage during rotation. In a case where a sensor such as a magnetic encoder is used, the rotor angle can be detected with high accuracy, and in a case where the rotor angle is obtained through sensor-less estimation, it is advantageous in terms of space saving and cost reduction. The temperature sensor Sc estimates the temperature of each exciting coil 4c, and as the temperature sensor Sc, a thermistor or the like is used, for example.

In this embodiment, in particular, the controller 2 is provided with the exciting coil temperature balance corrector 19, and further, the control calculator 18 is provided with the energization phase adjustment section 23 which is the heat load balancing section, and the allowable error setting section 24. On the basis of values obtained from the current sensor 21, etc., the exciting coil temperature balance corrector 19 estimates the balance degree among the heat generation amounts of the plurality of exciting coils 4c (u, v, w phases in this example) in the electric motor 4. If the exciting coil temperature balance corrector 19 estimates that the heat generation amount of a specific exciting coil 4c among the plurality of exciting coils 4c is larger than the heat generation amounts of the other exciting coils 4c, 4c, through comparison with a predetermined threshold, for example, the exciting coil temperature balance corrector 19 outputs a request signal to the energization phase adjustment section 23 so as to shift the energization phase of the electric motor 4. For example, specifically, the exciting coil temperature balance corrector 19 is implemented by a hardware circuit or by a software function on a processor (not shown) which can, by use of: a LUT (look up table) realized by software or hardware; a predetermined conversion function stored in a software library or hardware, etc., equivalent thereto; and further, a predetermined comparison function or hardware equivalent thereto, etc., hereinafter referred to as "embodied model", calculate the heat generation amount of a specific exciting coil 4c and the heat generation amounts of the other exciting coils 4c, 4c upon reception of inputs such as values obtained from the current sensor 21, estimate the above-described balance degree, and output the above-described request signal.

When the energization phase adjustment section 23 receives the request signal, the energization phase adjustment section 23 causes the electric motor 4 to rotate within the range of allowable error set by the allowable error setting section 24, to adjust the energization phase. For example, specifically, the energization phase adjustment section 23 is implemented by a hardware circuit or by a software function on a processor (not shown) which can, upon reception of inputs such as the present electrical angle and the request signal and by use of the above-described embodied model, calculate the energization phase and output the calculated energization phase.

Figure 3:
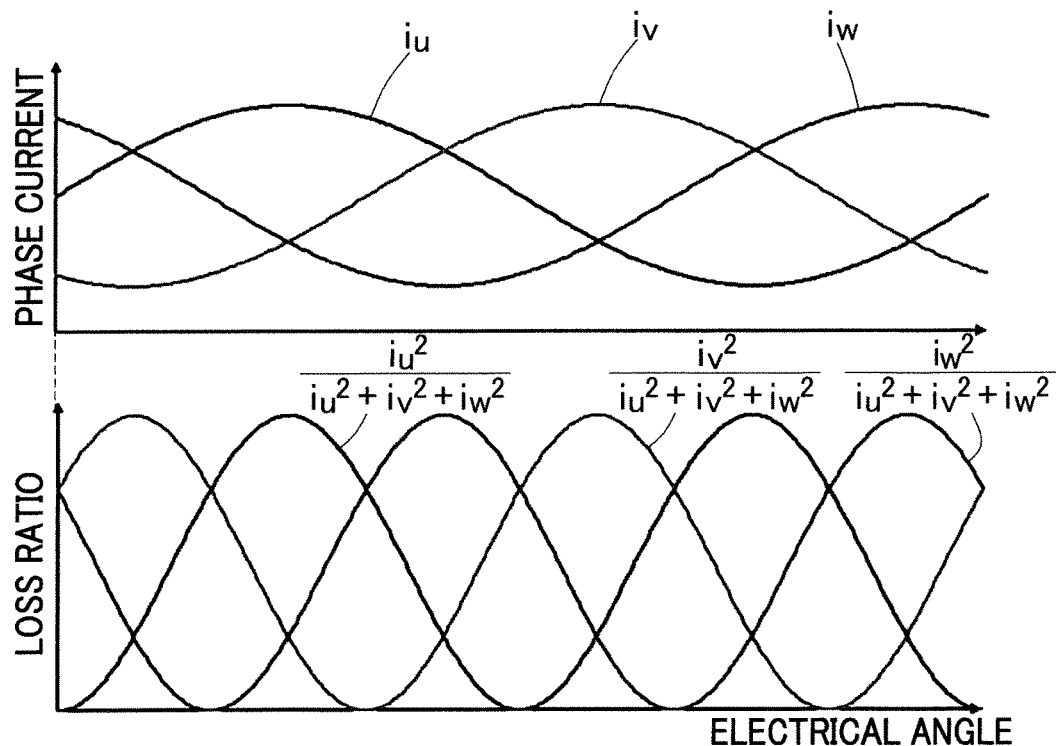
FIG. 3 is a diagram showing the relationship between electrical angle phase and three phase currents and the relationship between electrical angle phase and loss, in one cycle of electrical angle in the electric brake device.

FIG. 3 is a diagram showing the relationship between electrical angle phase and three phase currents and the relationship between electrical angle phase and loss, in one cycle of electrical angle in this electric brake device. Hereinafter, description is given also with reference to FIG. 1 as appropriate. In FIG. 3, the upper diagram shows three phase currents, and the lower diagram shows the proportion of copper loss of a predetermined phase to the entire copper loss, that is, loss ratio. The loss ratio indicates the easiness of heat generation of the exciting coil 4c of each phase. When the phase current of the u-phase exciting coil 4c is defined as $i_u$, the phase current of the v-phase exciting coil 4c is defined as $i_v$, and the phase current of the w-phase exciting coil 4c is defined as $i_w$, the loss ratio of each phase at an electrical angle is expressed as follows.

Loss ratio of $u$-phase: $i_u^2/(i_u^2+i_v^2+i_w^2)$

Loss ratio of $v$-phase: $i_v^2/(i_u^2+i_v^2+i_w^2)$

Loss ratio of $w$-phase: $i_w^2/(i_u^2+i_v^2+i_w^2)$

Figure 4:
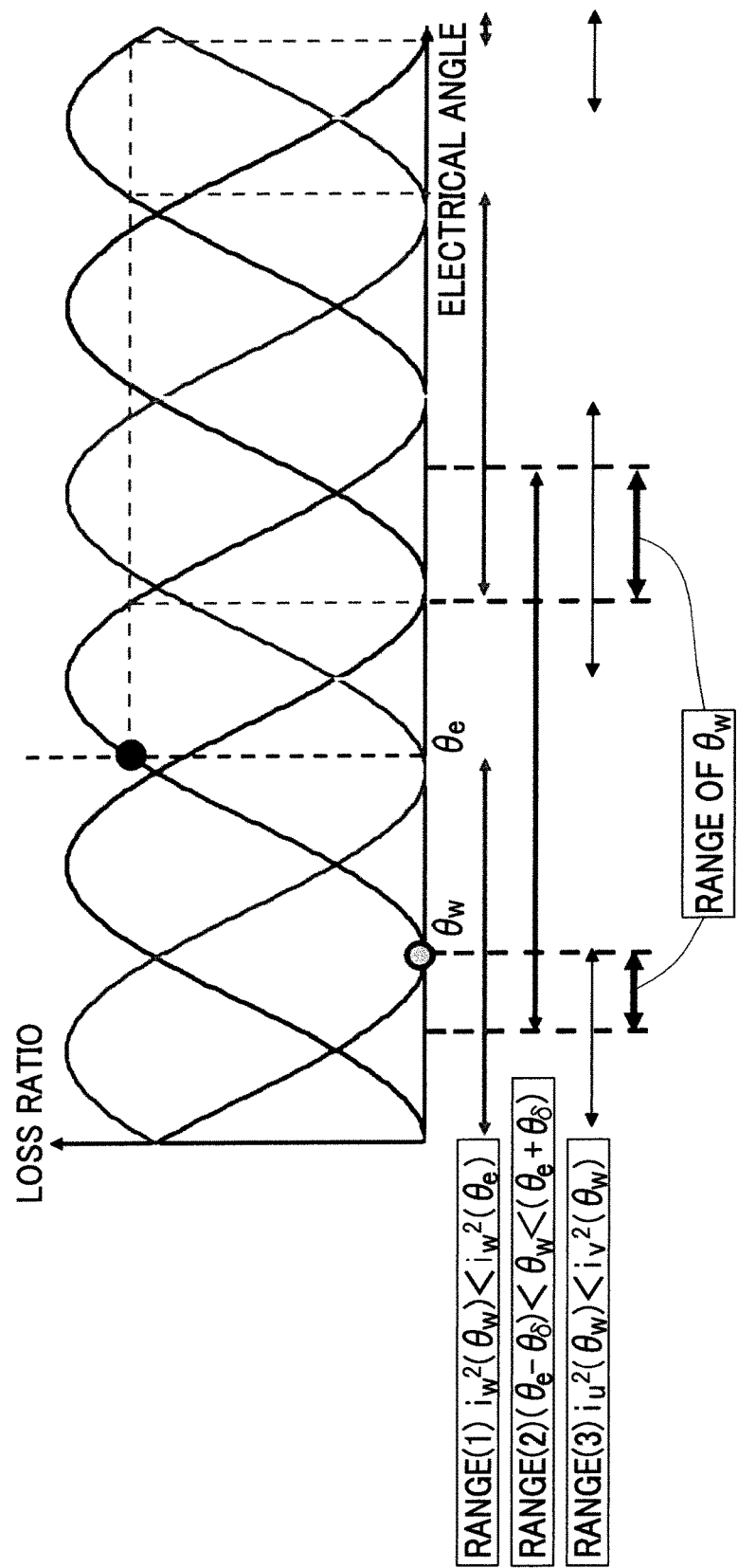
FIG. 4 is a diagram showing an example of deriving the range of electrical angle that should be adjusted in order to reduce loss in the exciting coils in the electric brake device.

FIG. 4 is a diagram showing an example of deriving the range of electrical angle that should be adjusted in order to reduce loss in the exciting coils 4c in the electric brake device. FIG. 4 shows an example of deriving the range of an electrical angle $\theta_w$ of w-phase performed in step S9 or the like in FIG. 5 described later. In FIG. 4, the horizontal axis represents electrical angle, and the vertical axis represents loss ratio of each phase, and FIG. 4 is as same as diagram in FIG. 3. In this deriving example, it is assumed that the electrical angle at present is $\theta_e$, and that an updated electrical angle in order to reduce the loss of w-phase is $\theta_w$.

<Condition 1>

The loss ratio $i_w^2(\theta_w)$ at the electrical angle $\theta_w$ has to be smaller than the present loss ratio $i_w^2(\theta_e)$. The range that satisfies this Condition 1 is given as range (1) in FIG. 4. In order to smooth the heat load, the electrical angle of the electric motor 4 is adjusted, and a range in which the heat load assuredly becomes lower after the electrical angle adjustment than that before the electrical angle adjustment is searched for.

<Condition 2>

The absolute value of an allowable error of a braking force that occurs as a result of setting or changing the electrical angle from $\theta_e$ to $\theta_w$ has to be not larger than a predetermined value. That is, the electrical angle $\theta_w$ has to be in a predetermined range having the present electrical angle $\theta_e$ substantially at the center thereof. In other words, the range in which the electrical angle of the electric motor 4 can be adjusted has to be within the range of the allowable error of the braking force. For example, specifically, the allowable error setting section 24 is implemented by a hardware circuit or a software function on a processor (not shown) which can, upon reception of inputs such as vehicle speed information of the vehicle and by use of the above-described embodied model, set and output the allowable error (corresponding to variation electrical angle $\theta_\delta$ (described later) in the drawing) that allows follow-up control to be performed on the braking force with respect to the target braking force. The range that satisfies this Condition 2 is given as range (2) in FIG. 4.

<Condition 3>

In order to balance the entire coil temperature, it would be appropriate that, in consideration of the states of the heat loads of the other u and v phases, the loss corresponding to the higher heat load is made to be smaller than the loss corresponding to the lower heat load. That is, it is sufficient that, between the corrected loss ratios $i_u^2(\theta_w)$, $i_v^2(\theta_w)$, a loss ratio relationship that is reverse to that between the present heat loads is realized. The range that satisfies this Condition 3 is given as range (3) in FIG. 4.

The range of the electrical angle $\theta_w$ that satisfies all the conditions above (Condition 1 to Condition 3) is given as the range shown in the lowest part of FIG. 4. The electrical angle $\theta_w$ that minimizes the loss ratio $i_w^2(\theta_w)$ in this range is the angle at the position with "$\theta_w$" which is indicated below the horizontal axis in FIG. 4.

Figure 5:
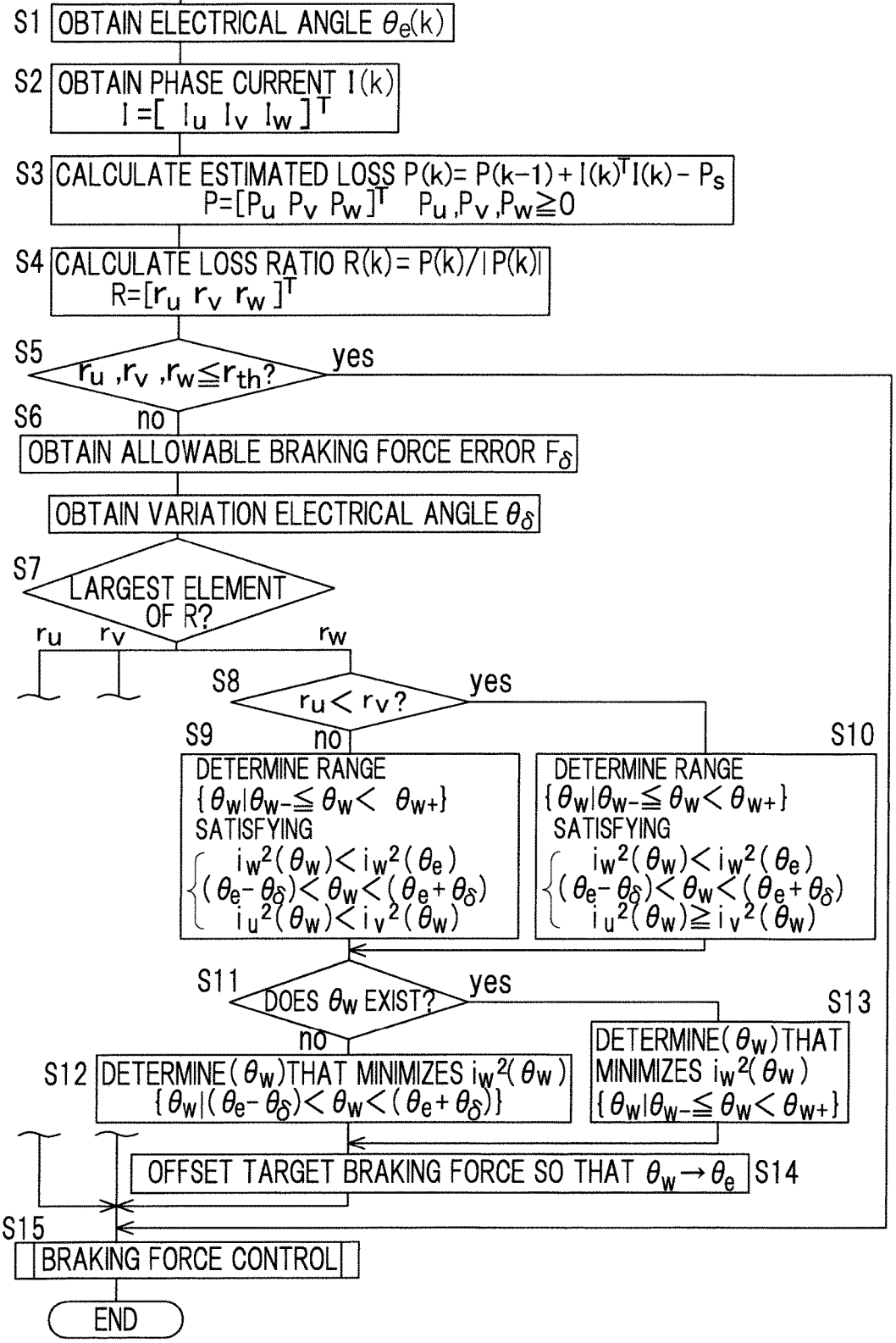
FIG. 5 is a flow chart showing a temperature balancing process for the exciting coils of the electric brake device.

FIG. 5 is a flow chart showing a temperature balancing process for the exciting coils 4c of this electric brake device. After this process is started, the control calculator 18 obtains a present electrical angle $\theta_e(\kappa)$ ($\kappa$ represents a discrete value on the time axis) (step S1), and obtains each phase current I($\kappa$) (step S2). Next, the exciting coil temperature balance corrector 19 calculates an estimated loss P($\kappa$) for each phase (step S3). Specifically, in a case where a predetermined braking force is maintained, copper loss of an exciting coil 4c is proportional to the square of the current. Thus, the exciting coil temperature balance corrector 19 may estimate the loss of the exciting coil 4c, on the basis of an integrated value of the square of the current detected by the current sensor 21 or a value proportional to this square of the current. When an estimated loss P($\kappa$) of each phase is calculated, a predetermined value $P_s$ may be subtracted. The predetermined value $P_s$ is determined in advance on the basis of a result of a test, a simulation, or the like.

Next, the exciting coil temperature balance corrector 19 calculates a loss ratio R($\kappa$) from the calculated estimated loss P($\kappa$) of each phase (step S4). Among the estimated losses above, the estimated loss of the specific exciting coil 4c (for now, any one of u-phase, v-phase, and w-phase) is larger than a predetermined threshold $r_{th}$ (step S5: no), the energization phase adjustment section 23 performs later-described operation of reducing the heat load of the specific exciting coil 4c (step S14, or the like). If the estimated loss of the specific exciting coil 4c is not larger than the predetermined threshold (step S5: yes), ordinary or normal braking force control by the basic control section 22 is performed (step S15). Then, this process is ended. In step S5, the difference or ratio among the estimated losses of the plurality of exciting coils may be used. The threshold is determined on the basis of a result of a test, a simulation, or the like.

As described above, when the estimated loss of the specific exciting coil 4c is larger than the predetermined threshold (step S5: no), the allowable error setting section 24 obtains an allowable error $F_\delta$ for an allowable braking force relative to the present target braking force, and the energization phase adjustment section 23 obtains a variation electrical angle $\theta_\delta$ that satisfies the allowable error $F_\delta$ (step S6). At this time, if the value of the allowable error $F_\delta$ is set to be variable such that: when the braking force is large and thus the electric motor 4 readily generates heat, the energization phase adjustment section 23 performs control of varying the braking force; and when the braking force is small and the electric motor 4 does not readily generate heat, the energization phase adjustment section 23 does not readily perform the control, it is preferable because unexpected braking force variation is less likely to occur.

Then, the exciting coil temperature balance corrector 19 determines the largest element (specific exciting coil 4c) that has the highest heat load among the u-phase, the v-phase, and the w-phase (step S7). As described above, when the target electrical angle is to be updated with respect to the present electrical angle, the conditions to be satisfied are "Condition 1: copper loss at the updated electrical angle is reduced; Condition 2: the updated target electrical angle is within a range which allows the electric motor 4 to be operated irrespective of the command for the braking force (target braking force), that is, within a predetermined braking force allowable error range. In addition to these conditions, preferably, as in steps S8 to S10, in consideration of the relationship between the estimated losses of the exciting coils 4c (in this example, exciting coils 4c of u-phase and v-phase) other than the specific exciting coil, correction is performed so as to satisfy "Condition 3: the loss of the exciting coil 4c that has the higher estimated loss is lowered".

Specifically, in a case where the heat load of the exciting coil 4c of the w-phase is higher than the heat loads of the exciting coils 4c, 4c of the u-phase and the v-phase (this description is based on this case), the exciting coil temperature balance corrector 19 determines the phases that have the second highest heat load and the third highest heat load (step S8). It should be noted that with respect to each case where either of the exciting coils 4c, 4c, of the u-phase and the v-phase has the highest heat load, the operation is basically the same. Thus, the process corresponding to step S8 to step S14 for each exciting coil 4c, 4c of the u, v-phase is omitted in FIG. 5.

Each of the cases where the phase having the second highest heat load is the u-phase (step S8: no), and where the phase having the second highest heat load is the v-phase (step S8: yes), the range of the electrical angle $\theta_w$ that satisfies all the above-described Conditions 1, 2, and 3 is determined (step S9, 10). At this time, there are cases where, as a result of inclusion of Condition 3, all the conditions are not satisfied (step S11: no). In such a case, the exciting coil temperature balance corrector 19 can determine an updated electrical angle on the basis of Conditions 1 and 2 (step S12). Then, the process is shifted to step S14.

If the electrical angle $\theta_w$ that satisfies all of Conditions 1, 2, and 3 exists (step S11: yes), the exciting coil temperature balance corrector 19 determines the electrical angle $\theta_w$ that minimizes the loss ratio $i_w^2(\theta_w)$ (step S13). Then, the energization phase adjustment section 23 offsets the target braking force such that the electrical angle $\theta_w$ becomes the electrical angle $\theta_c$ (step S14), to control the braking force (step S15). Then, this process is ended.

Figure 6:
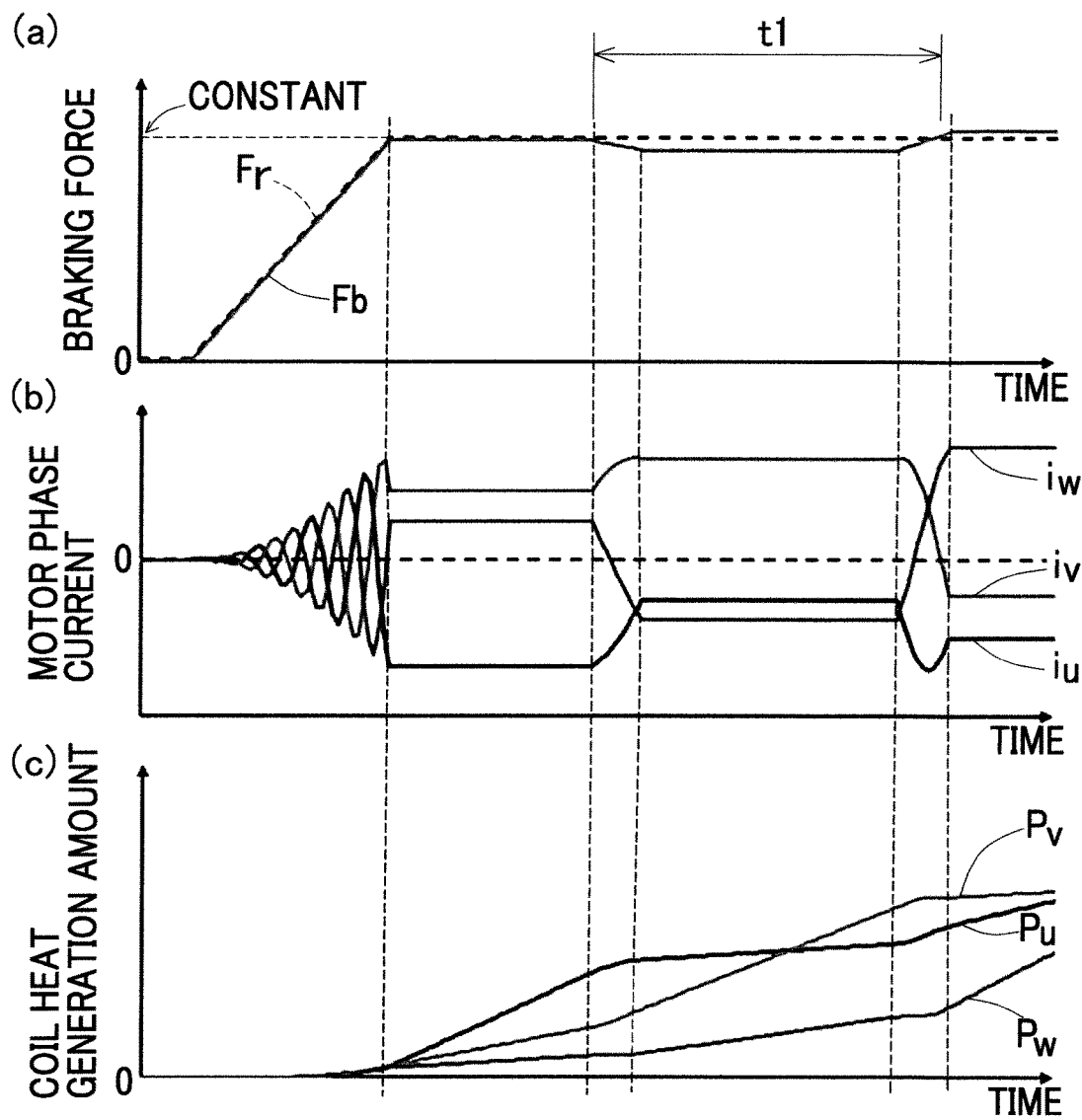
FIG. 6 is a diagram showing an operation example in which control of the electric brake device is performed.

FIG. 6 is a diagram showing an operation example in which the control of this electric brake device is performed. As shown in chart (a) of FIG. 6, the control calculator 18 is performing follow-up control on braking force $F_b$ with respect to target braking force $F_r$. When the breaking force $F_b$ is maintained to be constant at a large braking force at which the electric motor 4 readily generates heat, the energization phase adjustment section 23 causes the braking force to be slightly varied for a time period t1 (t1 is several milliseconds to several tens of milliseconds, for example) within the above-described allowable error range. Accordingly, as shown in chart (b) of FIG. 6, the motor phase currents continuously applied at constant levels are changed, respectively. As a result, as shown in chart (c) of FIG. 6, the heat generation amount of the specific exciting coil 4c is decreased, and the heat loads of the exciting coils 4c can be equalized.

Figure 7:
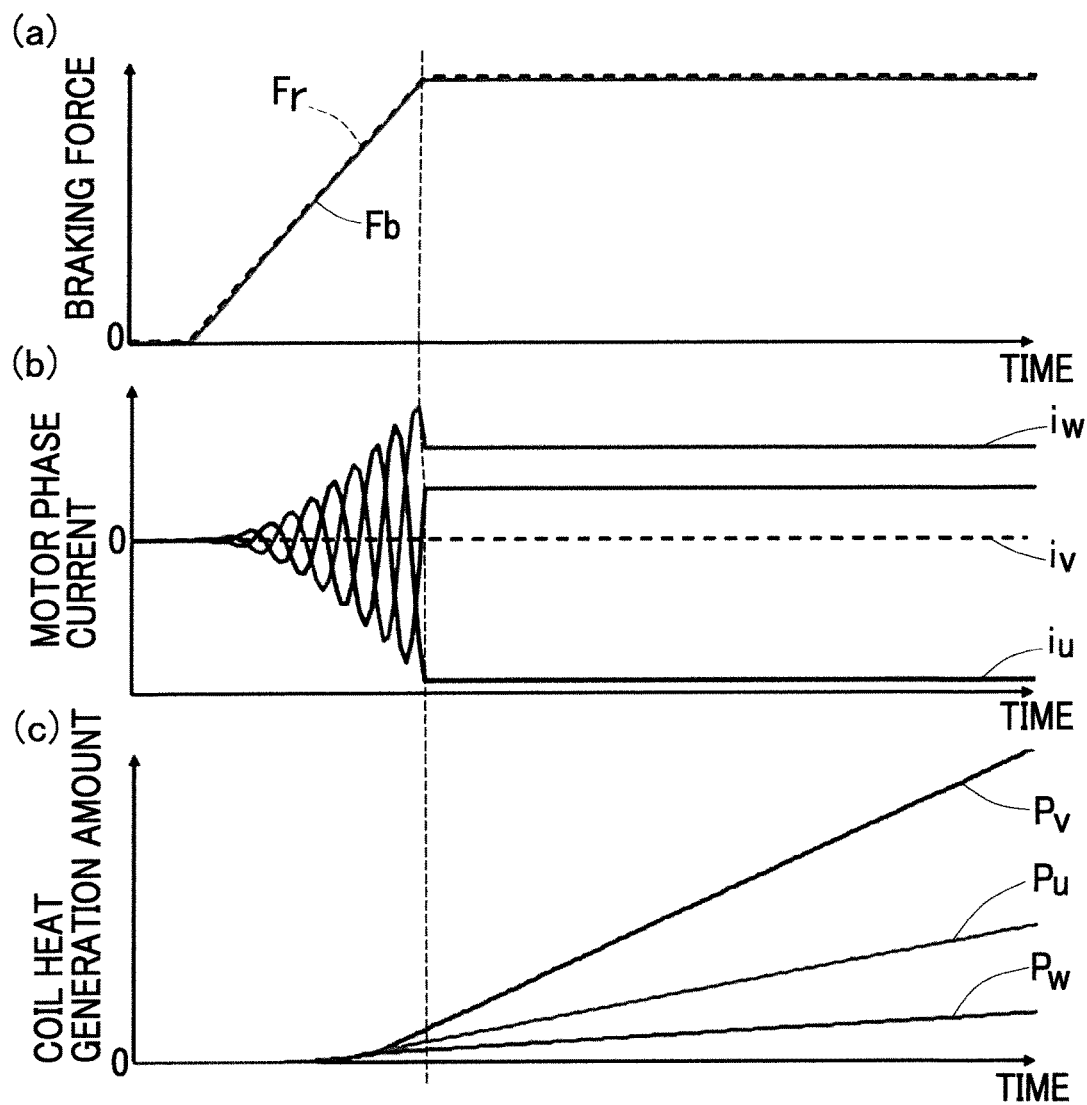
FIG. 7 is a diagram showing an operation example in which control of an electric brake device of a conventional example is performed.

In contrast to this, FIG. 7 is a diagram showing an operation example in which control of an electric brake device of a conventional example is performed. In this example, as shown in chart (a) of FIG. 7, although follow-up control is performed on the braking force $F_b$ with respect to the target braking force $F_r$, since a predetermined braking force $F_b$ is maintained, the motor phase currents are continuously applied at constant levels as shown in chart (b) of FIG. 7. As a result, as shown in chart (c) of FIG. 7, the heat generation amount of the specific exciting coil readily increases, i.e., the integrated value of the coil copper loss readily increases.

According to the electric brake device described above, in a case where the braking force is maintained to be constant, the motor phase currents are continuously applied always at constant levels. Thus, the losses of the respective exciting coils vary, which results in a difference in the heat generation amounts of the respective exciting coils. Thus, the exciting coil temperature balance corrector 19 of the electric brake device DB according to the present embodiment estimates the balance degree of the heat generation amounts of the plurality of the exciting coils 4c. When the exciting coil temperature balance corrector 19 has estimated that the heat generation amount of a specific exciting coil 4c is larger than the heat generation amounts of the other exciting coils 4c, the energization phase adjustment section 23 decreases the heat generation amount of the specific exciting coil 4c. Accordingly, durability against heat of the electric motor 4 can be improved. Thus, with respect to the electric motor 4, the rated torque can be improved or the output limit time of the maximum torque can be extended. In addition, the design requirement for copper loss relative to torque can be reduced, and the size and weight of the electric motor 4 can be reduced.

The allowable error setting section 24 causes the allowable error to be varied such that the larger the target braking force or the braking force is, the larger the allowable error is. In this case, fine or detailed control can be realized such that: when the braking force is large and thus the electric motor 4 readily generates heat, the energization phase adjustment section 23 readily performs control of varying the braking force; and when the braking force is small and thus the electric motor 4 does not readily generate heat, the energization phase adjustment section 23 does not readily perform the control. Accordingly, unexpected braking force variation is less likely to occur. Then it is preferable because occupants of the vehicle are prevented from feeling that riding comfort is impaired.

Another embodiment is described. As shown in FIG. 1, a vehicle speed information obtaining section 26 which obtains vehicle speed information of the vehicle having the electric brake device DB mounted thereto may be provided to the control calculator 18, for example. The vehicle speed information is inputted to the vehicle speed information obtaining section 26 through the higher-order ECU 17, for example. In this case, the allowable error setting section 24 may cause the allowable error to be varied such that the lower the vehicle speed obtained by the vehicle speed information obtaining section 26 is, the larger the allowable error becomes. In this case, fine or detailed control can be realized such that: for example, when the vehicle is travelling at a middle-to-low speed, the allowable error is made larger such that the energization phase adjustment section 23 readily performs control of varying the braking force; and when the vehicle is travelling at a high speed where highly accurate braking force control is required, the allowable error is made smaller such that the energization phase adjustment section 23 does not readily perform the control.

As the electric motor, a DC motor using a brush, a slip ring, and the like, or a stepping motor may be used, for example. The linear motion mechanism may be a mechanism such as a planetary roller screw, a ball ramp, or the like. As the speed reduction mechanism, a parallel gear, a worm gear, a planetary gear, or the like may be used. As for Functional aspect, a belt or the like that is inexpensive may be used. As each of the various sensors, sensor-less estimation may be used as necessary. In general, in a case where sensor-less estimation is used, the cost can be reduced but the accuracy is impaired, compared to those in a case where a sensor is used.

Although the preferred modes for carrying out the present invention have been described on the basis of the embodiments with reference to the drawings, the embodiments disclosed herein are, in all aspects, illustrative and not restrictive. The scope of the present invention is indicated by claims, not by the above description. Those skilled in the art will readily conceive numerous changes and modifications within the framework of obviousness upon the reading of the specification herein presented of the present invention. Accordingly, such changes and modifications are to be construed as included in the scope of the invention defined by claims or in a scope equivalent thereto.

REFERENCE NUMERALS

2 . . . controller
4 . . . electric motor
4c . . . exciting coil
6 . . . linear motion mechanism (friction member operator)
8 . . . brake rotor
9 . . . friction member
19 . . . exciting coil temperature balance corrector (heat balance degree estimator)
23 . . . energization phase adjustment section (heat load balancing section)
24 . . . allowable error setting section
26 . . . vehicle speed information obtaining section
Sa . . . braking force sensor (braking force estimator)

What is claimed is:

1. An electric brake device comprising:
a brake rotor;
a friction member configured to be brought into contact with the brake rotor;
a friction member operator configured to bring the friction member into contact with the brake rotor;
an electric motor configured to drive the friction member operator; and
a controller configured to control a braking force by means of the electric motor, wherein
the controller includes:
a heat balance degree estimator configured to estimate a balance degree among heat generation amounts of a plurality of exciting coils in the electric motor; and
a heat load balancing section configured to decrease a heat generation amount of a specific exciting coil, when the heat balance degree estimator has estimated that the heat generation amount of the specific exciting coil among the plurality of exciting coils is larger than heat generation amounts of the other exciting coils, to equalize the heat generation amounts of the respective exciting coils.

2. The electric brake device as claimed in claim 1, wherein
the heat balance degree estimator estimates the balance degree among the heat generation amounts of the respective exciting coils on the basis of an integrated value of a value proportional to a square of an estimated value of a current in each exciting coil.

3. The electric brake device as claimed in claim 2, wherein
when the heat balance degree estimator has determined that a value of either one of or both of: a difference between the integrated value in a determined exciting coil and the integrated values of the other exciting coils; and a ratio of the differences has exceeded a threshold, the heat load balancing section decreases the heat generation amount of the specific exciting coil.

4. An electric brake device comprising:
a brake rotor;
a friction member configured to be brought into contact with the brake rotor;
a friction member operator configured to bring the friction member into contact with the brake rotor;
an electric motor configured to drive the friction member operator
a controller configured to control a braking force by means of the electric motor; and
a braking force estimator configured to determine an estimated value of a braking force that occurs by the friction member being pressed against the brake rotor, wherein
the controller includes:
 a heat balance degree estimator configured to estimate a balance degree among heat generation amounts of a plurality of exciting coils in the electric motor;
 a heat load balancing section configured to decrease a heat generation amount of a specific exciting coil, when the heat balance degree estimator has estimated that the heat generation amount of the specific exciting coil among the plurality of exciting coils is larger than heat generation amounts of the other exciting coils; and
 an allowable error setting section configured to set an allowable error that is to be used in follow-up control performed on the braking force with respect to a target braking force, and
the heat load balancing section causes the braking force to be varied so as to realize an energization phase in which an absolute value of a current of the specific exciting coil becomes smaller than an original value thereof within a range of the allowable error set by the allowable error setting section.

5. The electric brake device as claimed in claim 4, wherein
the allowable error setting section causes the allowable error to be varied such that the larger the target braking force or the braking force is, the larger the allowable error becomes.

6. The electric brake device as claimed in claim 4, wherein
the controller includes a vehicle speed information obtaining section configured to obtain information of vehicle speed of a vehicle to which the electric brake device is mounted, and
the allowable error setting section causes the allowable error to be varied such that the lower the vehicle speed obtained by the vehicle speed information obtaining section is, the larger the allowable error becomes.

* * * * *